United States Patent
Putz et al.

(10) Patent No.: US 12,283,808 B2
(45) Date of Patent: Apr. 22, 2025

(54) DEVICE FOR ELECTROLYSIS FROM PHOTOVOLTAICALLY SUPPLIED POWER AND A METHOD OF OPERATING SUCH A DEVICE

(71) Applicant: SMA Solar Technology AG, Niestetal (DE)

(72) Inventors: Martin Putz, Kassel (DE); Andreas Falk, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 168 days.

(21) Appl. No.: 18/108,751

(22) Filed: Feb. 13, 2023

(65) Prior Publication Data

US 2023/0198247 A1 Jun. 22, 2023

Related U.S. Application Data

(63) Continuation of application No. PCT/EP2021/072848, filed on Aug. 17, 2021.

(30) Foreign Application Priority Data

Aug. 18, 2020 (DE) ........... 10 2020 121 593.2

(51) Int. Cl.
*H02H 7/20* (2006.01)
*H02H 1/00* (2006.01)
(Continued)

(52) U.S. Cl.
CPC ............ *H02H 7/20* (2013.01); *H02H 1/0007* (2013.01); *H02S 40/36* (2014.12); *H02S 50/10* (2014.12)

(58) Field of Classification Search
CPC ........ H02H 7/20; H02H 1/0007; H02S 40/36; H02S 50/10; C25B 15/00; C25B 1/04;
(Continued)

(56) References Cited

U.S. PATENT DOCUMENTS 5,712,572 A 1/1998 Tamechika et al.
9,869,710 B2 * 1/2018 Oberzaucher .......... G01R 31/12
(Continued)

FOREIGN PATENT DOCUMENTS

CN 104630815 A 5/2015
DE 102010039692 A1 3/2012
(Continued)

OTHER PUBLICATIONS

International Search Report dated Nov. 30, 2021 in connection with PCT/EP2021/072848.

*Primary Examiner* — Jared Fureman
*Assistant Examiner* — Nicolas Bellido
(74) *Attorney, Agent, or Firm* — Eschweiler & Potashnik, LLC

(57) ABSTRACT

The disclosure relates to a device and associated method for electrolysis from photovoltaically generated DC power, including an electrolyzer and a DC/DC converter. The DC/DC converter feeds DC power to the electrolyzer, the DC power is generated by a photovoltaic (PV) sub-generator connected to the DC/DC converter. The PV sub-generator is connected to the DC/DC converter via a first disconnector that is coupled to an isolation monitoring structure in such a way that closure of the first disconnector requires a successful check for sufficient isolation of the PV sub-generator. The PV sub-generator has a main string and a second disconnector arranged between the main string and the first disconnector. The second disconnector is coupled to a fault current monitoring circuit in such a way that the second disconnector is opened in the event that a predefinable limit value of the fault current is exceeded.

14 Claims, 3 Drawing Sheets

(51) Int. Cl.
*H02S 40/36* (2014.01)
*H02S 50/10* (2014.01)

(58) Field of Classification Search
CPC ...... Y02E 60/36; Y02E 10/56; H02J 2300/24; H02J 1/102
See application file for complete search history.

(56) References Cited

U.S. PATENT DOCUMENTS

| | | | |
|---|---|---|---|
| 10,505,437 B2* | 12/2019 | Tsai | G05B 15/02 |
| 10,910,993 B2 | 2/2021 | Hackl et al. | |
| 2011/0301772 A1 | 12/2011 | Zuercher et al. | |
| 2012/0026631 A1 | 2/2012 | Kazemi et al. | |
| 2012/0049627 A1 | 3/2012 | Matsuo et al. | |
| 2012/0049630 A1 | 3/2012 | Hofheinz | |
| 2012/0126626 A1* | 5/2012 | Falk | H02J 1/10 307/80 |
| 2015/0185272 A1 | 7/2015 | Oberzaucher et al. | |
| 2016/0380589 A1 | 12/2016 | Morita et al. | |
| 2018/0159466 A1* | 6/2018 | Ringer | H02S 40/32 |
| 2021/0363651 A1* | 11/2021 | Seymour | H02M 7/219 |
| 2022/0373587 A1* | 11/2022 | Fischereder | G01R 15/04 |
| 2024/0097551 A1* | 3/2024 | Hartmann | H02M 1/007 |

FOREIGN PATENT DOCUMENTS

| | | | | |
|---|---|---|---|---|
| DE | 102013112431 A1 | 6/2014 | | |
| DE | 102013227174 A1 | 7/2015 | | |
| DE | 112014006074 T5 * | 9/2016 | | G01R 31/02 |
| EP | 3252947 A1 | 12/2017 | | |
| JP | H0815345 A | 1/1996 | | |
| JP | 2001338672 A | 12/2001 | | |
| JP | 2005312287 A | 11/2005 | | |
| JP | 2015164028 A | 9/2015 | | |
| WO | 2019246433 A1 | 12/2019 | | |

* cited by examiner

DEVICE FOR ELECTROLYSIS FROM PHOTOVOLTAICALLY SUPPLIED POWER AND A METHOD OF OPERATING SUCH A DEVICE

CROSS REFERENCE TO RELATED APPLICATIONS

This application is a continuation of International Patent Application Number PCT/EP2021/072848, filed on Aug. 17, 2021, which claims priority to German Patent Application number 10 2020 121 593.2, filed on Aug. 18, 2020, and is hereby incorporated by reference in its entirety.

FIELD

The disclosure relates to a device for electrolysis by means of photovoltaically generated DC power and to an operating method for such a device.

BACKGROUND

An electrolyzer is a device in which a chemical reaction, i.e., a substance conversion, is brought about with the aid of electrical current, and electrolysis takes place. In the case of water electrolysis, the decomposition of water into hydrogen and oxygen takes place. Proposals have been made to connect photovoltaic generators (PV generators) to an electrolyzer using a DC/DC converter.

A "DC/DC converter" refers to an electrical circuit that converts a DC voltage supplied at the input to a DC voltage having a higher, lower or inverted voltage level. The conversion takes place with the aid of a periodically operating electronic switch and one or more energy stores. DC/DC converters are self-commutated power converters and are also referred to as DC choppers.

A photovoltaic installation (PV installation) may comprise a multiplicity of electrical components, for example, PV modules distributed in a decentralized manner over a large area. A group of PV modules grouped as a string, i.e., in the form of a series circuit, is also called a PV string. A plurality of PV strings connected in parallel with one another are referred to as PV main strings. A plurality of PV main strings connected in parallel with one another are referred to as PV sub-generators. A PV generator of a PV system can have one or more PV sub-generators that are connected in parallel with one another.

In large systems of over 500 kW, the PV generator is often grounded via a GFDI (ground fault detection interruption) or the PV generator is operated ungrounded. This entails restrictions in system design. For example, the UL62109 standard must be observed.

The electric power supplied to electrolyzers must be adapted to the power consumption of the electrolyzers. Electrolyzers typically have a power consumption of 1 to 20 MW. The supplied electrical power must be designed accordingly.

SUMMARY

One object of the disclosure is to feed an electrolyzer with the highest possible power from photovoltaics (PV) that can be scaled as required.

A device for electrolysis from photovoltaically generated DC power comprises an electrolyzer and a DC/DC converter and at least one PV sub-generator. The electrolyzer is, for example, a water electrolyzer for decomposing water into hydrogen and oxygen. The DC/DC converter is configured to feed DC power to the electrolyzer via a DC bus, wherein the DC power is generated by a photovoltaic (PV) sub-generator connected to the DC/DC converter. The PV sub-generator is connected to the DC/DC converter via a first disconnector, wherein the first disconnector is coupled to an isolation monitoring structure/circuit such that closure of the first disconnector requires a successful check for sufficient isolation of the PV sub-generator. The PV sub-generator has a main string, wherein a second disconnector is arranged between the main string and the first disconnector, which second disconnector is coupled to a fault current monitoring circuit/sensor of the main string such that the second disconnector is opened in the event that a predefinable limit value of the fault current is exceeded.

The device makes it possible to implement the electrolyzer, for example, with soft grounding via the electrolysis liquid and to supply it with the highest possible PV power, which can be scaled as required. The electrolyzer can be grounded at the negative pole or at the center point, for example, via its electrolysis liquid. Grounding can take place via an ohmic resistance in the range of 1 to 100 ohms. In each case, at least one PV sub-generator is coupled via a DC/DC converter.

The device can be used to supply an electrolyzer with electrical power using a PV sub-generator, wherein a ground fault in the PV sub-generator can be reliably detected by monitoring the fault current of the main string or main strings of the PV sub-generator and leads to disconnection of the affected PV sub-generator. This disconnection is achieved by the second disconnector. If a further PV sub-generator is connected to the DC/DC converter, it has a further second disconnector having a further fault current monitoring circuit/sensor associated with the further second disconnector. This further fault current monitoring circuit/sensor then monitors the fault current of the main string or main strings, which are assigned to the further PV sub-generator. The fault current monitor is configured, for example, as an RCD (residual current device). In the case of a ground fault at or in the PV sub-generator, a fault current detected by the fault current monitor, e.g. by the RCD, flows. The affected PV sub-generator can then be switched off via the second disconnector, which is configured, for example, as a two-pole switch.

A flexible, scalable combination of PV sub-generator and DC/DC converter that supplies an electrolyzer in parallel is made possible. It is also possible to connect a plurality of PV sub-generators to the DC/DC converter. The PV sub-generators connected to a DC/DC converter then form a PV generator. If the device has a plurality of DC/DC converters, a PV generator is respectively connected to a respective DC/DC converter, wherein the DC/DC converters are configured to feed DC power to the electrolyzer via the DC bus. The PV generator or PV generators can each have one or more PV sub-generators. This improves the scalability and flexibility of the device.

In addition to the DC/DC converter, the device can have further DC/DC converters, wherein one or more PV sub-generators can be connected to each DC/DC converter. Each PV sub-generator can have one or more main strings, wherein in each case a second disconnector is arranged between a respective main string and the first disconnector. It is also possible for a second disconnector to be arranged between a respective PV sub-generator and the first disconnector.

Each of the PV sub-generators within a DC/DC converter arrangement is dimensioned such that a leakage current under normal conditions is so small that it cannot cause fire.

It is in particular possible to implement DC couplings in which grounding takes place on the load side. It is possible to ground the load, i.e., the electrolyzer. Grounding the center point or a pole of the electrolyzer (negative pole or positive pole) is possible. Grounding can also take place at any intermediate potential. Direct low-resistance grounding or grounding via an impedance is possible. The grounding can shift during operation due to asymmetries in the electrolyzer. The electrolyzer consists of a number of electrolysis cells in series. Grounding is also optionally possible indirectly via the parasitic resistance of the electrolysis liquid.

In one embodiment, the DC/DC converter comprises a step-down converter. A step-down converter converts a DC voltage supplied at the input to a DC voltage of a lower voltage value.

The PV generator is operated in isolation. This means that the PV generator has no independent ground connection. This is checked by the isolation monitoring structure/circuit, and the first disconnector is closed when isolation of the PV generator is ensured. Prior to each connection via the first disconnector, the isolation resistance of each PV generator is determined by the isolation monitoring structure/circuit configured, for example, as an isolation measuring device. In addition, the first disconnector is closed when the isolation resistance is higher than a minimum resistance.

In addition, in such an installation, grounding is realized that can be disconnected if a fault current is exceeded via the ground connection. This increases the safety of the device.

In one embodiment, one pole of the PV sub-generator can be electrically connected to one pole of the DC bus, wherein, for example, during operation of the PV sub-generator, one pole of the PV sub-generator is electrically connected to the pole of the DC bus during operation of the PV sub-generator. The DC/DC converter, in one embodiment, has a changeover switch for selecting the electrically connected pole of the PV sub-generator. In addition, in one embodiment, the DC/DC converter is configured to make the selection of the pole to be connected in consideration of the fault current monitoring circuit/sensor.

In one embodiment, fault current monitor has coaxial conductors for lines to be monitored. This has the advantage that stray fields in the magnet core, for example ring core, of the monitoring circuit, e.g., of the RCD, occur only to a small extent, even if the rated current becomes larger and exceeds, for example, 250 A. In an alternative embodiment, the fault current monitor circuit/sensor has a laminated alternating layer stack for lines to be monitored.

In one embodiment, the main string has a plurality of parallel strings, wherein the fault current for the main string and/or for the respective strings is monitored. Optionally, an RCD can thus be located on each string or each main string or on a plurality of main strings of a PV sub-generator. Each PV sub-generator comprises a number of main strings that are additionally provided with what is known as a main string fuse at each pole.

In one embodiment, the device has a PV generator that has a PV sub-generator or a plurality of PV sub-generators, wherein the PV generator is connected to the DC/DC converter via the first disconnector, wherein the first disconnector is coupled to the isolation monitoring structure/circuit such that closure of the first disconnector requires a successful check for sufficient isolation of the PV generator. In this embodiment, the scalability of the device is further improved.

In some embodiments, the main string has a rated power of more than 500 kW and/or the DC/DC converter has a rated power of more than 2 MW. It is possible to realize PV generators having a large, flexible total output, in particular also above 8 MW peak. This is achieved, for example, via scaling, isolation detection using the first disconnector and separate protection of PV sub-generators via the second disconnector.

Each of the parallel PV generators is connected to a DC/DC converter and configured such that its parasitic leakage current does not exceed a certain limit of, for example, 1.66 A, even in the worst case, for example, in the case of moisture and/or high voltage. In some embodiments, in the event of a short circuit in one of the parallel PV generators, a current flow from the other generators can be detected and blocked by actuating the semiconductor switches of the other DC/DC converters. In some embodiments, the PV sub-generator can be protected with fuses such that, in the event of a short circuit in the affected PV sub-generator, the other DC/DC converters impress a current in such a way that the fuse or fuses of the part of the PV generator affected by the short-circuit are blown.

In addition to the second disconnectors of the PV sub-generators and the first disconnector, further DC switches can be provided in the PV generators. This further increases safety.

In a method of operating a device for electrolysis from photovoltaically generated DC power using an electrolyzer and a DC/DC converter that feeds the electrolyzer with DC power via a DC bus, which DC power is generated by a photovoltaic (PV) sub-generator connected to the DC/DC converter, the PV sub-generator is switchably connected to the DC/DC converter. The PV sub-generator comprises a main string, wherein the main string comprises a fault current monitoring circuit/sensor and the main string is switchably connected to the DC/DC converter. The method comprises:

before the PV sub-generator is switched on to the connected DC/DC converter: checking an isolation of the PV sub-generator using an isolation monitoring structure/circuit, wherein switching on takes place when a minimum isolation is exceeded, after the PV sub-generator is switched on: monitoring the main string by the fault current monitoring circuit/sensor, wherein the main string is disconnected from the DC/DC converter when the monitored fault current exceeds a predefinable limit value.

BRIEF DESCRIPTION OF THE FIGURES

The disclosure is illustrated below with reference to the drawings, in which.

DETAILED DESCRIPTION

Figure 1:
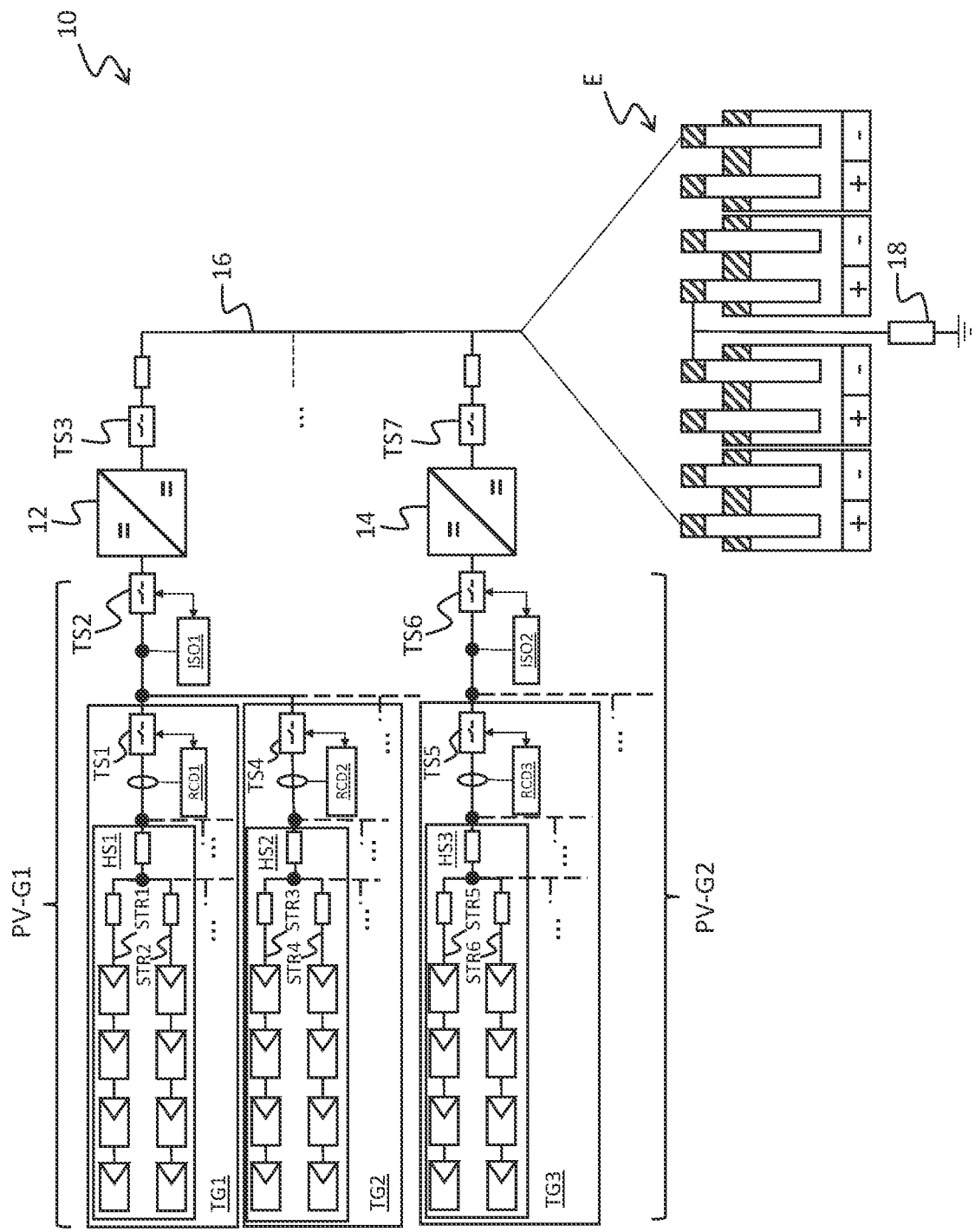
FIG. 1 shows a device for electrolysis from photovoltaically generated DC power.

FIG. 1 shows a device 10 for electrolysis from photovoltaically generated DC power. An electrolyzer E is connected via a DC bus 16 to DC/DC converters 12, 14. The DC/DC converters 12, 14 can each be disconnected from the DC bus 16 via a disconnector TS3, TS7. The DC bus 16 is designed to supply DC electric power to the electrolyzer E, by which electrolysis, for example, the decomposition of water into hydrogen and oxygen, is carried out in the electrolyzer E. The electrolyzer is grounded via an ohmic resistor 18.

FIG. 1 shows two DC/DC converters 12, 14. The device 10 is scalable and can also have only one DC/DC converter 12, 14 or more than two DC/DC converters 12, 14. A PV generator PV-G1, PV-G2 is connected to each DC/DC converter 12, 14. The electrical power generated by the PV generators PV-G1, PV-G2 is converted by the DC/DC converters 12, 14 and fed via the DC bus 16 to the electrolyzer E. Each of the PV generators PV-G1, PV-G2 can be disconnected from the associated DC/DC converter 12, 14 by a first disconnector TS2, TS6.

The PV generator PV-G1 is connected to a first side of the DC/DC converter 12. On a second side of the DC/DC converter 12, the DC bus 16 is connected to the DC/DC converter 12 via the disconnector TS3 and a converter fuse. The DC/DC converter 12 can be disconnected from the DC bus 16 by the disconnector TS3. The PV generator PV-G1 can be disconnected from the DC/DC converter 12 via a first disconnector TS2. The first disconnector TS2 is connected to an isolation monitoring structure or circuit ISO1. When the device 10 is put into operation, the isolation monitoring structure/circuit ISO1 checks whether the PV generator PV-G1 is electrically isolated. If this is the case, the first disconnector TS2 is closed and the PV generator PV-G1 is electrically connected to the DC/DC converter 12.

The PV generator PV-G1 comprises two sub-generators TG1, TG2. The PV generator PV-G1 can also comprise only one sub-generator TG1, TG2 or more than two PV sub-generators TG1, TG2. Each of the PV sub-generators TG1, TG2 comprises a fault current monitoring sensor or circuit RCD1, RCD2, for example, in the form of a residual current device. The fault current monitoring sensor or circuit RCD1 monitors the fault current in the PV sub-generator TG1 and disconnects the PV sub-generator from the DC/DC converter 12 via a second disconnector TS1 if the detected fault current exceeds a certain predefinable limit. The means for monitoring the fault current RCD2 monitors the fault current in the PV sub-generator TG2 and disconnects the PV sub-generator from the DC/DC converter 12 via a second disconnector TS4 if the detected fault current exceeds a certain predefinable limit.

In the example shown, the PV sub-generator TG1 has a main string HS1, which in turn has two strings ST1, ST2. The PV sub-generator TG1 can also have more than one main string HS1. The main string HS1 can also have only one string ST1, ST2 or more than two strings ST1, ST2.

In the example shown, the PV sub-generator TG2 has a main string HS2, which in turn has two strings STR3, STR4. The PV sub-generator TG2 can also have more than one main string HS2. The main string HS2 can also have only one string ST3, ST4 or more than two strings STR3, STR4.

The PV generator PV-G2 is connected to a first side of the DC/DC converter 14. On a second side of the DC/DC converter 14, the DC bus 16 is connected to the DC/DC converter 14 via the disconnector TS7 and an ohmic resistor. The DC/DC converter 14 can be disconnected from the DC bus 16 by the disconnector TS7. The PV generator PV-G2 can be disconnected from the DC/DC converter 14 via a first disconnector TS6. The first disconnector TS6 is connected to an isolation monitoring structure or circuit ISO2. When the device 10 is put into operation, the isolation monitoring structure or circuit ISO2 checks whether the PV generator PV-G2 is electrically isolated. If this the case, the first disconnector TS6 is closed and the PV generator PV-G2 is electrically connected to the DC/DC converter 14.

The PV generator PV-G2 comprises a PV sub-generator TG3. The PV generator PV-G2 can also comprise more than one PV sub-generator TG3. The PV sub-generator TG3 comprises a fault current monitoring circuit or sensor RCD3, for example, in the form of a residual current device. The fault current monitoring circuit or sensor RCD3 monitors the fault current in the PV sub-generator TG3 and disconnects the PV sub-generator from the DC/DC converter 14 via a second disconnector TS5 if the detected fault current exceeds a certain predefinable limit.

In the example shown, the PV sub-generator TG3 has a main string HS3, which in turn has two strings STR5, STR6. The PV sub-generator TG3 can also have more than one main string HS3. The main string HS3 can also have only one string STR5, STR6 or more than two strings STR5, STR6.

Figure 2:
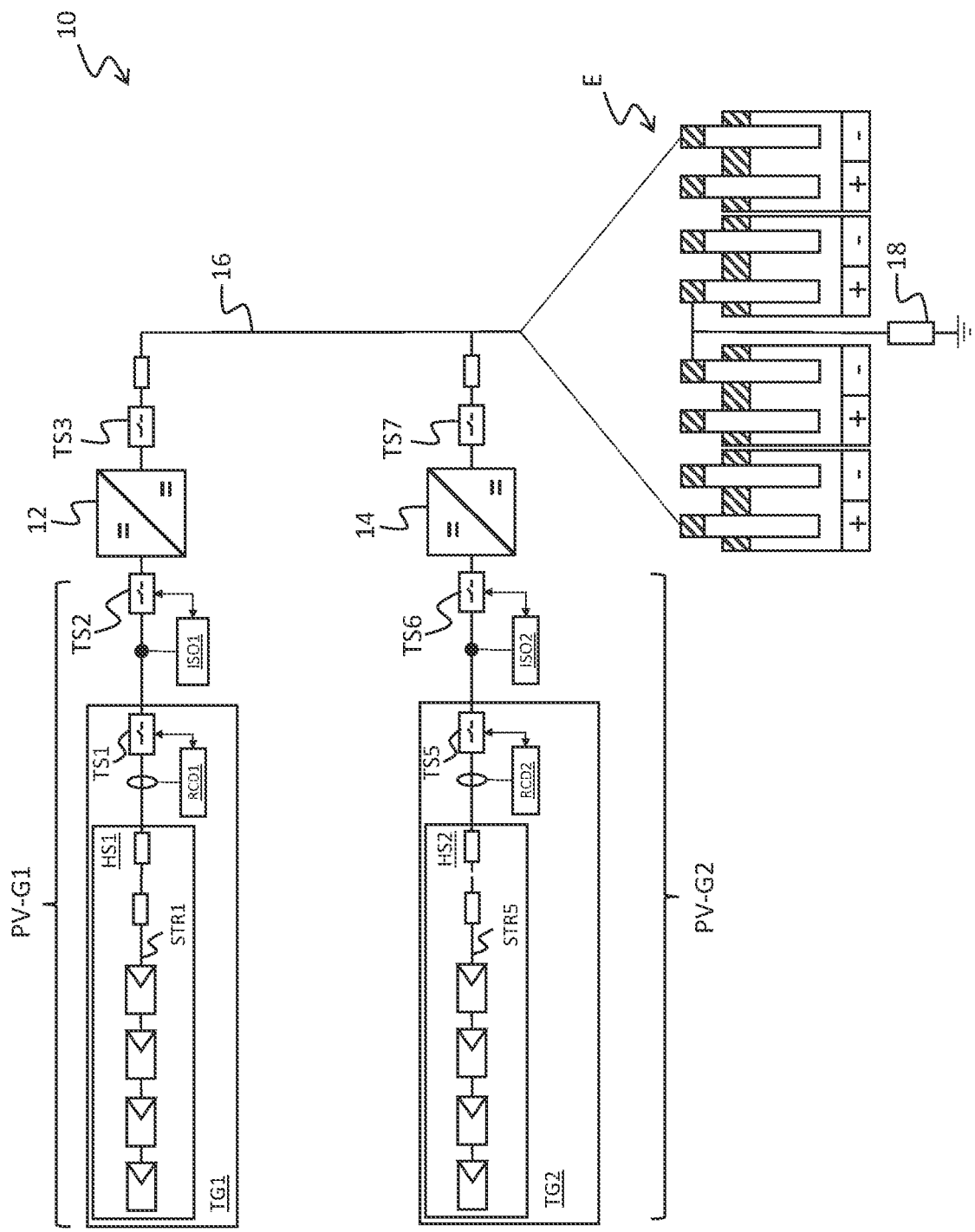
FIG. 2 shows an example of a device for electrolysis from photovoltaically generated DC power, and FIG. 3 schematically shows a method for operating a device for electrolysis from photovoltaically generated DC power.

In one embodiment of the device 10 shown in FIG. 2, the device 10 has the electrolyzer E, which is grounded via the ohmic resistor 18. DC electric power is supplied to electrolyzer E via DC bus 16. The DC electric power is generated by two PV generators PV-G1, PV-G2 and converted by the DC/DC converters 12, 14 and fed to the DC bus 16.

The DC/DC converter 12 is connected to the DC bus 16 via the disconnector TS3 and an ohmic resistance and can be disconnected from the DC bus via the disconnector TS3. The DC/DC converter 14 is connected to the DC bus 16 via the disconnector TS7 and an ohmic resistance and can be disconnected from the DC bus via the disconnector TS7.

The PV generator PV-G1 comprises the isolation monitoring structure or circuit ISO1 connected to the first disconnector TS2. When sufficient isolation of the PV generator PV-G1 is detected by the isolation monitoring structure/circuit ISO1 the first disconnector TS2 is closed and the PV generator PV-G1 is connected to the DC/DC converter 12.

The PV generator PV-G1 comprises a PV sub-generator TG1 protected by a fault current monitoring circuit or sensor RCD1 having an associated second disconnector TS1. If an excessively high fault current is detected by the monitoring circuit/sensor RCD1, the PV sub-generator TG1 is disconnected from the DC/DC converter 12 by the second disconnector TS1. The PV sub-generator TG1 has a main string HS1 having a string STR1.

The PV generator PV-G2 comprises the isolation monitoring structure/sensor ISO2 connected to the first disconnector TS6. When sufficient isolation of the PV generator PV-G2 is detected by the isolation monitoring means ISO2 the first disconnector TS6 is closed and the PV generator PV-G2 is connected to the DC/DC converter 14.

The PV generator PV-G2 has a PV sub-generator TG3 protected by a fault current monitoring circuit/sensor RCD3 having an associated second disconnector TS5. If an excessively high fault current is detected by the monitoring circuit/sensor RCD3, the PV sub-generator TG3 is disconnected from the DC/DC converter 14 by the second disconnector TS5. The PV sub-generator TG3 has a main string HS3 having a string STR5.

Figure 3:
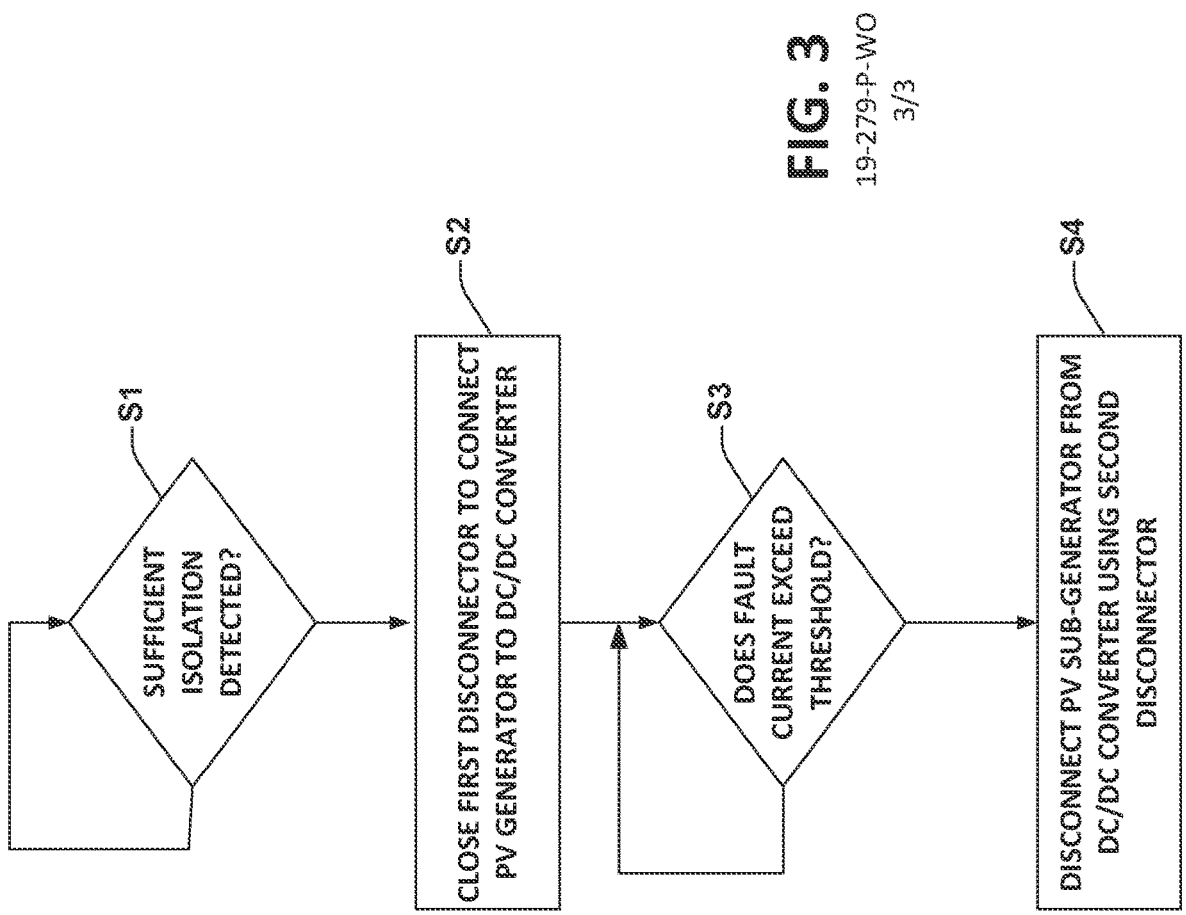

FIG. 3 schematically shows a flow chart for a method for operating a device 10.

Act S1 is executed when the device 10 is put into operation. If the isolation monitoring structure/circuit ISO1, ISO2, ISO3 detects sufficient isolation of the assigned PV generator PV-G1, PV-G2 (see FIG. 1+FIG. 2) at S1, the assigned first disconnector TS2, TS6 (see. FIG. 1+FIG. 2) is closed at S2 and the PV generator PV-G1, PV-G2 is electrically connected to the associated DC/DC converter 12, 14 (see FIG. 1+FIG. 2).

Act S3 is carried out during operation of the device 10. At S3, the fault monitoring circuit/sensor RCD1, RCD2, RCD3 monitors whether a fault current in respectively assigned PV sub-generators TG1, TG2, TG3 (see FIG. 1+FIG. 2) exceeds a predefinable threshold value. If this is the case, the PV sub-generator TG1, TG2, TG3, for which a fault current exceeding the threshold value was detected, is disconnected from the associated DC/DC converter 12, 14 (see FIG. 1+FIG. 2) at S4 using the associated second disconnector TS1, TS4, TS5 (see FIG. 1+FIG. 2).

What is claimed is:

1. A device for electrolysis from photovoltaically generated DC power, comprising:
    an electrolyzer,
    a DC/DC converter that is configured to feed DC power to the electrolyzer via a DC bus, wherein the DC power is generated by a photovoltaic (PV) sub-generator connected to the DC/DC converter,
    wherein the PV sub-generator is connected to the DC/DC converter via a first disconnector,
    wherein the first disconnector is coupled to an isolation monitoring structure in such a way that closure of the first disconnector requires a successful check for isolation of the PV sub-generator,
    wherein the PV sub-generator comprises a main string,
    wherein a second disconnector is arranged between the main string and the first disconnector, and
    wherein the second disconnector is coupled to a fault current monitoring circuit of the main string in such a way that the second disconnector is opened in the event that a predefinable limit value of a fault current in the main string is exceeded.

2. The device according to claim 1, wherein the DC/DC converter comprises a step-down converter.

3. The device according to claim 1, wherein one pole of the PV sub-generator is electrically connected to one pole of the DC bus, wherein, during operation of the PV sub-generator, one pole of the PV sub-generator is electrically connected to the pole of the DC bus.

4. The device according to claim 3, wherein the DC/DC converter comprises a change-over switch configured to select the electrically connected pole of the PV sub-generator.

5. The device according to claim 4, wherein the DC/DC converter is configured to make a selection of a pole to be connected based on the fault current monitoring circuit.

6. The device according to claim 1, wherein the fault current monitoring circuit comprises coaxial conductors for lines to be monitored.

7. The device according to claim 1, wherein the fault current monitoring circuit comprises a laminated alternating layer stack for lines to be monitored.

8. The device according to claim 1, wherein the main string comprises a plurality of parallel strings, and wherein the fault current monitoring circuit is configured to monitor the parallel strings.

9. The device according to claim 1, wherein the PV sub-generator comprises a plurality of parallel main strings, wherein the second disconnector comprises a plurality of second disconnectors respectively arranged between the plurality of parallel main strings and the first disconnector.

10. The device according to claim 1, wherein the device comprises a PV generator that comprises the PV sub-generator or a plurality PV of sub-generators, wherein the PV generator is connected to the DC/DC converter via the first disconnector, wherein the first disconnector is coupled to the isolation monitoring structure in such a way that closure of the first disconnector requires a successful check for isolation of the PV generator.

11. The device according to claim 10, wherein the device comprises a plurality of PV generators and a plurality of DC/DC converters, wherein each PV generator is connected to a respective DC/DC converter, and wherein the DC/DC converters are configured to feed DC power to the electrolyzer via the DC bus.

12. The device according to claim 1, wherein the main string has a rated power of more than 500 kW.

13. The device according to claim 1, wherein the DC/DC converter has a rated power of more than 2 MW.

14. A method of operating a device for electrolysis from photovoltaically generated DC power, comprising an electrolyzer and a DC/DC converter that feeds the electrolyzer with DC power via a DC bus, wherein the DC power is generated by a photovoltaic (PV) sub-generator connected to the DC/DC converter, wherein the PV sub-generator is switchably connected to the DC/DC converter, and wherein the PV sub-generator comprises a main string, wherein the main string comprises a fault current monitoring circuit and the main string is switchably connected to the DC/DC converter, the method comprising:
    before the PV sub-generator is switched on to the connected DC/DC converter: checking an isolation of the PV sub-generator using an isolation monitoring structure, wherein switching on takes place when a predetermined isolation is exceeded,
    after the PV sub-generator has been switched on: monitoring a fault current in the main string using the fault current monitoring circuit, wherein the main string is disconnected from the DC/DC converter when a predefinable limit value.

* * * * *